(12) United States Patent
Laxmikant Dhepe et al.

(10) Patent No.: US 12,528,929 B2
(45) Date of Patent: Jan. 20, 2026

(54) DEPOLYMERIZATION OF POLYMERS WITH ESTER, ETHER AND CARBONATE LINKAGES USING ACIDIC IONIC LIQUID (AIL) CATALYST

(71) Applicant: COUNCIL OF SCIENTIFIC AND INDUSTRIAL RESEARCH AN INDIAN RESGISTERED BODY INCORPORATED UNDER THE REGN. OF SOC. ACT (ACT XXI OF 1860), Delhi (IN)

(72) Inventors: Paresh Laxmikant Dhepe, Maharashtra (IN); Manuraj Kallumkal, Maharashtra (IN)

(73) Assignee: COUNCIL OF SCIENTIFIC AND INDUSTRIAL RESEARCH AN INDIAN RESGISTERED BODY INCORPORATED UNDER THE REGN. OF SOC. ACT (ACT XXI OF 1860), New Delhi (IN)

( * ) Notice: Subject to any disclaimer, the term of this patent is extended or adjusted under 35 U.S.C. 154(b) by 647 days.

(21) Appl. No.: 17/904,279

(22) PCT Filed: Feb. 24, 2021

(86) PCT No.: PCT/IN2021/050177
§ 371 (c)(1),
(2) Date: Aug. 15, 2022

(87) PCT Pub. No.: WO2021/171311
PCT Pub. Date: Sep. 2, 2021

(65) Prior Publication Data
US 2023/0078491 A1    Mar. 16, 2023

(30) Foreign Application Priority Data
Feb. 25, 2020    (IN) .............................. 202011007863

(51) Int. Cl.
*C08J 11/24*    (2006.01)
*B01J 31/02*    (2006.01)

(52) U.S. Cl.
CPC .......... *C08J 11/24* (2013.01); *B01J 31/0225* (2013.01)

(58) Field of Classification Search
CPC ................................................ C08J 11/10–28
See application file for complete search history.

(56) References Cited

U.S. PATENT DOCUMENTS 7,772,293 B2    8/2010    Whiston et al.

FOREIGN PATENT DOCUMENTS

CN    101249456 A    *    8/2008
WO    WO-2021171311 A1    9/2021

OTHER PUBLICATIONS

Machine Translation of CN101249456A. Aug. 27, 2008. (Year: 2008).*
Zhang et al. Synthesis of Ionic Liquid and Glycolysis of PET by Microwave-assisted Method. Fine Chemicals, 2012, 29(4), 342-346. (Year: 2012).*
Machine Translation of Zhang et al. Synthesis of Ionic Liquid and Glycolysis of PET by Microwave-assisted Method. Fine Chemicals, 2012, 29(4), 342-346. (Year: 2012).*
Hu et al. Alkali-Decomposition of Poly(ethylene terephthalate) in Mixed Media of Nonaqueous Alcohol and Ether. Study on Recycling of Poly( ethylene terephthalate). Polymer Journal, 1997, 29(9), 708-712. (Year: 1997).*
"International Application Serial No. PCT/IN2021/050177, International Search Report dated Jun. 11, 2021", (Jun. 11, 2021), 2 pgs.
"International Application Serial No. PCT/IN2021/050177, Written Opinion dated Jun. 11, 2021", (Jun. 11, 2021), 4 pgs.
Al-Sabagh, A.M., et al., "Greener routes for recycling of polyethylene terephthalate", Egyptian Journal of Petroleum 25, (Apr. 16, 2015), 53-64.
Geyer, B., et al., "Recycling of poly (ethylene terephthalate)—A review focusing on chemical methods", eXPRESS Polymer Letters vol. 10, No. 7 (2016) 559-586, (2016), 559-586.
Guo, Jiao, et al., "Efficient Alcoholysis of polycarbonate catalyzed by recyclable lewis acidic ionic liquids", Industrial & Engineering Chemistry Research 57, 32, (Aug. 1, 2018), 10915-10921.
Iannone, Francesco, et al., "Ionic liquids/ZnO nanoparticles as recyclable catalyst for polycarbonate depolymerization", Journal of Molecular Catalysis A: Chemical 426, (2017), 107-116.
Liu, Fusheng, et al., "Hydrolysis reaction of poly(ethylene terephthalate) using ionic liquids as solvent and catalyst", Journal of Applied Polymer Science 114 (6), (Aug. 12, 2009), 3561-3565.
Wang, Hui, et al., "Degradation of poly (ethylene terephthalate) using ionic liquids", Green Chem., 2009, 11, 1568-1575, (Jul. 16, 2009), 1568-1575.
Yue, Qun Feng, et al., "Metal-containing ionic liquids: highly effective catalysts for degradation of poly (ethylene terephthalate)", Advances in Materials Science and Engineering, vol. 2014, Article ID 454756, (Apr. 7, 2014), 6 pgs.

\* cited by examiner

*Primary Examiner* — Stephen E Rieth
(74) *Attorney, Agent, or Firm* — Schwegman Lundberg & Woessner, P.A.

(57) ABSTRACT

The present invention provides an effective and selective process for the depolymerization of polyethylene terephthalate (PET), polyethylene furanoate (PEF), polylactic acid, polycarbonates, polyethers and polyamides into pure and high yielding valorized products by combining the glycolysis-hydrolysis reactions using a homogeneous acidic ionic liquid (AIL) catalyst, resulting in excellent polymer conversion.

4 Claims, 6 Drawing Sheets

DEPOLYMERIZATION OF POLYMERS WITH ESTER, ETHER AND CARBONATE LINKAGES USING ACIDIC IONIC LIQUID (AIL) CATALYST

PRIORITY CLAIM TO RELATED APPLICATIONS

This application is a U.S. national stage filing under 35 U.S.C. § 371 from International Application No. PCT/IN2021/050177, filed on 24 Feb. 2021, and published as WO2021/171311 on 2 Sep. 2021, which claims the benefit under 35 U.S.C. 119 to India application No. 202011007863, filed on 25 Feb. 2020, the benefit of priority of each of which is claimed herein, and which applications and publication are hereby incorporated herein by reference in their entirety.

FIELD OF THE INVENTION

The present invention relates to a depolymerisation process for the polymers with linkages such as ester, carbonates, ether and amide using acidic ionic liquid (AIL) catalyst. More particularly, the present invention provides an effective depolymerization of polyethylene terephthalate (PET), polylactic acid and polycarbonates into high yielding valorized products by combining glycolysis-hydrolysis reactions using acidic ionic liquid catalyst.

BACKGROUND OF THE INVENTION

Polyethylene terephthalate, most commonly abbreviated as PET, is well known thermoplastic polymer resin of polyester (semicrystalline) with excellent tensile and impact strength, chemical resistance, clarity, processability, transparency, and appropriate thermal stability. Polyethylene terephthalate (PET) is widely used for different industrial as well as domestic applications such as fibers for clothing, containers for liquids and foods, thermoforming for manufacturing, and in combination with glass fibers for engineering resins.

Polyethylene Terephthalate (PET) Polycarbonate (PC)

Poly-condensation of terephthalic acid (TPA) and ethylene glycol (EG) or by the transesterification of dimethyl terephthalate (DMT) with ethylene glycol (EG) are commonly known processes for the preparation of Polyethylene terephthalate (PET) in the literature. The amount of wastage generating from the widespread usage of the Polyethylene terephthalate (PET) is growing rapidly. It is creating hazards to the nature as it does not decompose readily. Polyethylene furanoate (PEF) is analogues to PET and is synthesized typically from renewable sugar derivatives and glycols. It has a potential to replace PET in some applications. Polycarbonates is another class of polymer which is generally used in many applications like safety shields, data storage, electronic components, construction material, bottles, phones etc. This polymer contains carbonate groups in its chemical structure. Polylactic acid (PLA) is a thermoplastic aliphatic polyester. In 2010, PLA was the second most important bioplastic of the world in regard to consumption volume. PLA is used as a feedstock material in desktop fused filament fabrication 3D printers, in tea bags, in cups etc.

Polyethylene furanoate (PEF)

Polylactic acid (PLA)

Polyethylene Furanoate (PEF) Polylactic Acid (PLA)

Polyethylene terephthalate (PET) or other polymers from the class mentioned above can be recycled chemically by fragmenting it through depolymerisation. The process of depolymerisation involves cleavage of the functional ester groups by reagents such as water (hydrolysis), alkali (alkalolysis), acids (acidolysis), glycols (glycolysis), alcohols (alcoholysis) and amines (aminolysis). Such depolymerisation reactions of PET yields various monomers which can be used as a precursor for next generation of plastics or for numerous other applications as platform chemicals. However, these depolymerisation processes possess few drawbacks. The article entitled "*Recycling of poly(ethylene terephthalate)—A review focusing on chemical methods*" by A. Kandelbauer et. al and published in the journal "*eXPRESS Polymer Letters* Vol. 10, No. 7 (2016) 559-586" provides a thorough survey of PET-recycling including energetic, material, thermo-mechanical and chemical methods. It focuses on chemical methods describing important reaction parameters and yields of obtained reaction products. It states that the main drawback associated with alcoholysis of PET, especially methanolysis is high pressure and temperature, which results into volatilization of methanol also. And the drawback associated with hydrolysis reactions are either they employ corrosive mineral acids and bases or use harsh reaction conditions.

The article entitled "Hydrolysis Reaction of Poly(ethylene terephthalate) Using Ionic Liquids as Solvent and Catalyst" by Xiaoping Ge and published in the journal "Journal of Applied Polymer Science, Vol. 114, 3561-3565 (2009)" reports conversion of PET into terephthalic acid by using ionic liquid. The art of prior work described in the article demands the use of a neutral ionic liquid as the solvent along with water as solvent for the reaction along with acidic ionic liquid catalyst, which is not recoverable. Furthermore, the work-up procedure for obtaining purified terephthalic acid is hard and needs further purification.

The article entitled "*Metal-Containing Ionic Liquids: Highly Effective Catalysts for Degradation of Poly(Ethylene*

Terephthalate)" by Qun Feng Yue et. al and published in the journal "*Advances in Materials Science and Engineering* Volume 2014, Article ID 454756, 6 pages" reports depolymerization of Poly(Ethylene Terephthalate) by using metal containing ionic liquids. Procedure described in the article obviously provides BHET as a depolymerisation product of PET. However, this procedure may lead to increase the product distribution, as monomer (BHET), dimer and oligomers. Additionally, the method employed in the prior art utilizes metal containing ionic liquid, which is not considered as a green catalyst due to the chances of metal poisoning in the products.

The article entitled "*Degradation of poly(ethylene terephthalate) using ionic liquids*" by Suojiang Zhang et. al and published in the journal "*Green Chem.*, 2009, 11, 1568-1575" reports use of ionic liquids for the depolymerisation of poly(ethylene terephthalate). It also states that glycolysis of the poly(ethylene terephthalate) (PET) generates bis (hydroxyethyl) terephthalate (BHET) monomer along with higher oligomers, which are difficult to purify with conventional methods and Hydrolysis of poly(ethylene terephthalate) (PET) under homogeneous acidic or basic conditions gives terephthalic acid (TPA), along with corrosion and pollution problems.

U.S. Pat. No. 7,772,293 B2 entitled "IONIC LIQUID SOLVENTS AND A PROCESS FOR THE DEPOLYMERIZATION OF POLYAMIDES" assigned to Invista North America S.A.R.L. and published on 10 Aug. 2010 covers a process for the hydrolysis of a polyamide derived from a diamine and a dicarboxylic acid. The process covered in the patent is not green as it involves the use of highly corrosive acid such as sulphuric acid, which my leads to complete digestion of reactants into char or tarry product. Moreover, solvents and catalyst used in the process are not recoverable.

The article entitled "*Efficient Alcoholysis of Polycarbonate Catalyzed by Recyclable Lewis Acidic Ionic Liquids*" by Fusheng Liu et. al and published in the journal "*Ind. Eng. Chem. Res.* 2018, 57, 32, 10915-10921" reports alcoholysis of waste polycarbonate (PC) using Lewis acidic ionic liquids (ILs). As evident from the mole ratio, the method requires high amount of alcohol, which may result the reaction at highly elevated pressures. Moreover, the use of metal based ionic liquid is not encouraged as an eco-friendly catalyst in green perspectives. The process also doesn't provide 4-isopropyl phenol as a product.

Therefore, thus there is a need in the art to find out a solution for the depolymerization of polyethylene terephthalate (PET), Polyethylene furanoate (PEF), Polylactic acid (PLA), polycarbonate, polyethers, and polyamide, which will generate valorised pure product for further utilization.

OBJECTIVES OF THE INVENTION

Main objective of the present invention is to provide a new, effective process for the depolymerization of polymers with linkages such as ester (for e.g. polyethylene terephthalate, polyethylene furanoate, polylactic acid, polyethylene naphthalate etc.), carbonates (for e.g. polycarbonates), ethers (polyethers) and amide (for e.g. polyamide) into high yielding valorized products by using acidic ionic liquid catalyst

SUMMARY OF THE INVENTION

Accordingly, to fulfil the objective, the present invention provides a new process for the effective depolymerisation of polymers with linkages such as ester (such as polyethylene terephthalate, polyethylene furanoate, polylactic acid, polyethylene naphthalate etc.), carbonates (polycarbonates), ethers (polyethers) and amide (polyamide) into high yielding valorized products.

In an aspect of the present disclosure, there is provided a process for the depolymerisation of polymers, wherein the process comprises the steps of:
 a) heating the reaction mixture of polymer and the acidic ionic liquid (AIL) catalyst in a suitable solvent mixture at a temperature in the range of 120-250° C. for a period in the range of 0.5 to 24 hours;
 b) adding water and diethyl ether into the reaction mixture obtained at step a) after completion of the reaction;
 c) washing ether layer obtained at step b) with aqueous NaOH solution;
 d) acidifying aqueous layer obtained at step c) to afford valorized product with 100% polymer conversion.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

Acronyms Used to Describe the Invention
 Polyethylene terephthalate: PET
 Polyethylene furanoate: PEF
 Polylactic acid: PLA
 Terephthalic acid: TA
 Ethylene glycol: EG
 Acidic ionic liquid: AIL

BRIEF DESCRIPTION OF THE DRA WINGS

The detailed description is described with reference to the accompanying figures. In the figures, the left-most digit(s) of a reference number identifies the figure in which the reference number first appears. The same numbers are used throughout the drawings to reference like features and components.

FIG. 4 depicts Chromatography (HPLC): HPLC analysis of both the obtained terephthalic acid (FIG. 4B) and the standard terephthalic acid (FIG. 4A) were done and it was found that the peaks in standard terephthalic acid is also appearing in the HPLC profile of terephthalic acid obtained by the depolymerisation of PET.

DETAILED DESCRIPTION OF THE INVENTION

The invention will now be described in detail in connection with certain preferred and optional embodiments, so that various aspects thereof may be more fully understood and appreciated.

Definitions

For convenience, before further description of the present disclosure, certain terms employed in the specification, and examples are delineated here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "polyester" refers to a polymeric compound where monomeric units are linked to each other via an ester group. In the present disclosure, the term "polyester" includes but not limited to polyethylene terephthalate (PET), polyethylene furanoate (PEF), polylactic acid (PLA), polyethylene naphthalate (PEN).

The term "polycarbonate" refers to a polymeric compound produced from monomers where each monomer is linked to the other by a carbonate group. In the present disclosure, the term "polycarbonate" includes but not limited to polycarbonate containing the precursor monomer of bisphenol A (BPA). They are typically produced by reaction between BPA and phosgene.

The term "polyether" refers to a polymeric compound produced from monomers where each monomer is linked to the other by an ether linkage. In the present disclosure, the term "polyether" includes but not limited to polyethylene glycol, polypropylene glycol, epoxy resins, lignin and carbohydrate based ethers and resins.

The term "polyamide" refers to a polymeric compound produced from monomers where each monomer is linked to the other by an amide group. In the present disclosure, the term "polyamide" includes but not limited to aliphatic polyamides such as nylon PA 6 and PA 66, polyphthalamides (PA 6T) and aramids.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature in the range of 120° C. to 250° C. should be interpreted to include not only the explicitly recited limits of about 125° C. to about 155° C. but also to include sub-ranges, such as 136° C. to 225° C., and so forth, as well as individual amounts, within the specified ranges, such as 140° C., and 168.9° C.

The present disclosure is not to be limited in scope by the specific embodiments described herein, which are intended for the purposes of exemplification only. Functionally-equivalent products, compositions, and methods are clearly within the scope of the disclosure, as described herein.

The present invention provides a new process for the depolymerization of polymers with linkages such as ester (such as polyethylene terephthalate, polyethylene furanoate, polylactic acid, Polyethylene naphthalate etc.), carbonates (polycarbonates), ethers (polyethers) and amide (polyamides) into high yielding valorized products.

In an embodiment of the present disclosure, there is provided a process for the depolymerisation of polymers, wherein the process comprises the steps of:
  a) heating the reaction mixture of polymer and the acidic ionic liquid (AIL) catalyst in a suitable solvent mixture at a temperature in the range of 120-250° C. for a period in the range of 0.5 to 24 hr;
  b) adding water and diethyl ether into the reaction mixture obtained at step a) after completion of the reaction;
  c) washing ether layer obtained at step b) with aqueous NaOH solution;
  d) acidifying aqueous layer obtained at step c) to afford valorized product with 100% polymer conversion.

In another embodiment of the present disclosure, there is provided a process for the depolymerization of polymers, wherein the process comprises the steps of:
  a) heating the reaction mixture of polymer and the acidic ionic liquid (AIL) catalyst, wherein polymer to catalyst ratio is in the range of 20.0:0.01-20:10.0, in an ethylene glycol:dioxane solvent mixture, wherein ethylene glycol:dioxane ratio is in the range of 1.0:0.01-1.0:5.0 (v/v), at a temperature in the range of 120-250° C. for a period in the range of 0.5 to 24 hour;
  b) adding water and diethyl ether into the reaction mixture obtained at step a) after completion of the reaction;
  c) washing ether layer obtained at step b) with aqueous NaOH solution; and
  d) acidifying the aqueous layer obtained at step c) to afford valorized product with 100% polymer conversion.

In an embodiment of the present disclosure, there is provided a process for the depolymerization of polymers, wherein the polymer is selected from the group comprising of polyethylene terephthalate (PET), Polyethylene furanoate (PEF), Polylactic acid (PLA), polycarbonate, polyethers, and polyamide. In a preferred embodiment of the present disclosure, there is provided a process for the depolymerization of polymers, wherein the polymer is polyethylene terephthalate (PET).

In an embodiment of the present disclosure, there is provided a process for the depolymerisation of polymers, wherein the polymer is selected from the group comprising of polyethylene terephthalate (PET), Polyethylene furanoate (PEF), Polylactic acid (PLA), polycarbonate, polyethers, and polyamide, and wherein the process comprises the steps of:
  a) heating the reaction mixture of polymer and the acidic ionic liquid (AIL) catalyst in a suitable solvent mixture at a temperature in the range of 120-250° C. for a period in the range of 0.5 to 24 hr;

b) adding water and diethyl ether into the reaction mixture obtained at step a) after completion of the reaction;

c) washing ether layer obtained at step b) with aqueous NaOH solution;

d) acidifying aqueous layer obtained at step c) to afford valorized product with 100% polymer conversion.

In an embodiment of the present disclosure, there is provided a process for the depolymerization of polymers, wherein the acidic ionic liquid (AIL) catalyst is selected from the group comprising of various cations and anions having acidic functionality. More particularly, the acidic ionic liquid (AIL) catalyst is selected from the group comprising of 1-methyl-3-(3-sulfopropyl)-imidazolium hydrogensulfate, $[C_3SO_3HMIM][HSO_4]$; 1-methyl-3-(3-sulfopropyl)-imidazolium p-toluenesulfonate, $[C_3SO_3HMIM][PTS]$; 1-methyl-3-(3-sulfopropyl)-imidazolium dihydrogenphosphate, $[C_3SO_3HMIM][H_2PO_4]$; 1-methyl-3-(sulfopropyl)-imidazolium chloride, $[C_3SO_3HMIM][Cl]$; 1-methyl-3-(3-sulfopropyl)-imidazolium cupric chloride, $[C_3SO_3HMIM][CuCl_3]$; 1-methyl-3-(3-sulfopropyl)-imidazolium ferric chloride, $[C_3SO_3HMIM][FeCl_4]$; 1-methyl-3-(3-sulfopropyl)-imidazolium stannic chloride, $[C_3SO_3HMIM][SnCl_3]$; 1-butyl-3-methylimidazolium chloride $[BMIM][Cl]$, 1-butyl-3-methylimidazolium bromide $[BMIM][Br]$, 1-methyl-3-(3-sulfopropyl)-benzimidazolium dihydrogenphosphate, $[C_3SO_3HBenzMIM][H_2PO_4]$, 3-sulfopropyl-P,P,P-triphenylphosphonium hydrogensulfate $[C_3SO_3H(C_6H_5)P][HSO_4]$, N,N,N-triethyl-3-sulfopropanaminium hydrogen sulphate, $[C_3SO_3H(C_2)_3N][HSO_4]$; N,N,N-triethyl-3-sulfopropanaminium p-toluenesulfonate, $[C_3SO_3H(C_2)_3N][PTS]$; N,N,N-triethyl-3-sulfopropanaminium chloride, $[C_3SO_3H(C_2)_3N][Cl]$ and N,N,N-triethyl-3-sulfopropanaminium dihydrogenphosphate, $[C_3SO_3H(C_2)_3N][H_2PO_4]$.

In an embodiment of the present disclosure, there is provided a process for the depolymerisation of polymers, wherein the process comprises the steps of:

a) heating the reaction mixture of polymer and the acidic ionic liquid (AIL) catalyst, wherein the acidic ionic liquid (AIL) catalyst is selected from the group comprising of 1-methyl-3-(3-sulfopropyl)-imidazolium hydrogensulfate, $[C_3SO_3HMIM][HSO_4]$; 1-methyl-3-(3-sulfopropyl)-imidazolium p-toluenesulfonate, $[C_3SO_3HMIM][PTS]$; 1-methyl-3-(3-sulfopropyl)-imidazolium dihydrogenphosphate, $[C_3SO_3HMIM][H_2PO_4]$; 1-methyl-3-(sulfopropyl)-imidazolium chloride, $[C_3SO_3HMIM][Cl]$; 1-methyl-3-(3-sulfopropyl)-imidazolium cupric chloride, $[C_3SO_3HMIM][CuCl_3]$; 1-methyl-3-(3-sulfopropyl)-imidazolium ferric chloride, $[C_3SO_3HMIM][FeCl_4]$; 1-methyl-3-(3-sulfopropyl)-imidazolium stannic chloride, $[C_3SO_3HMIM][SnCl_3]$; 1-butyl-3-methylimidazolium chloride $[BMIM][Cl]$, 1-butyl-3-methylimidazolium bromide $[BMIM][Br]$, 1-methyl-3-(3-sulfopropyl)-benzimidazolium dihydrogenphosphate, $[C_3SO_3HBenzMIM][H_2PO_4]$, 3-sulfopropyl-P,P,P-triphenylphosphonium hydrogensulfate $[C_3SO_3H(C_6H_5)P][HSO_4]$, N,N,N-triethyl-3-sulfopropanaminium hydrogen sulphate, $[C_3SO_3H(C_2)_3N][HSO_4]$; N,N,N-triethyl-3-sulfopropanaminium p-toluenesulfonate, $[C_3SO_3H(C_2)_3N][PTS]$; N,N,N-triethyl-3-sulfopropanaminium chloride, $[C_3SO_3H(C_2)_3N][Cl]$ and N,N,N-triethyl-3-sulfopropanaminium dihydrogenphosphate, $[C_3SO_3H(C_2)_3N][H_2PO_4]$, and wherein polymer to catalyst ratio is in the range of 20.0:0.01-20:10.0, in an ethylene glycol:dioxane solvent mixture, wherein ethylene glycol:dioxane ratio is in the range of 1.0:0.01-1.0: 5.0 (v/v), at a temperature in the range of 120-250° C. for a period in the range of 0.5 to 24 hr;

b) adding water and diethyl ether into the reaction mixture obtained at step a) after completion of the reaction;

c) washing ether layer obtained at step b) with aqueous NaOH solution;

d) acidifying aqueous layer obtained at step c) to afford valorized product with 100% polymer conversion.

In a particular embodiment of the present disclosure, there is provided a process for the depolymerization of polymers, wherein the 1-methyl-3-(3-sulfopropyl)-imidazolium hydrogensulfate, $[C_3SO_3HMIM][HSO_4]$ is used as an acidic ionic liquid (AIL) catalyst.

In an embodiment of the present disclosure, there is provided a process for the depolymerization of polymers, wherein the process comprises the steps of:

a) heating the reaction mixture of polymer and the acidic ionic liquid (AIL) catalyst, wherein said acidic ionic liquid (AIL) is 1-methyl-3-(3-sulfopropyl)-imidazolium hydrogensulfate, $[C_3SO_3HMIM][HSO_4]$ is used as a catalyst, and wherein polymer to catalyst ratio is in the range of 20.0:0.01-20:10.0, in an ethylene glycol:dioxane solvent mixture, wherein ethylene glycol:dioxane ratio is in the range of 1.0:0.01-1.0:5.0 (v/v), at a temperature in the range of 120-250° C. for a period in the range of 0.5 to 24 hour;

b) adding water and diethyl ether into the reaction mixture obtained at step a) after completion of the reaction;

c) washing ether layer obtained at step b) with aqueous NaOH solution; and d) acidifying the aqueous layer obtained at step c) to afford valorized product with 100% polymer conversion.

In an embodiment of the present disclosure, there is provided a process for the depolymerisation of polymers, wherein the polymer is selected from the group comprising of polyethylene terephthalate (PET), Polyethylene furanoate (PEF), Polylactic acid (PLA), polycarbonate, polyethers, and polyamide, and wherein the process comprises the steps of:

a) heating the reaction mixture of polymer and the acidic ionic liquid (AIL) catalyst, wherein the acidic ionic liquid (AIL) catalyst is selected from the group comprising of 1-methyl-3-(3-sulfopropyl)-imidazolium hydrogensulfate, $[C_3SO_3HMIM][HSO_4]$; 1-methyl-3-(3-sulfopropyl)-imidazolium p-toluenesulfonate, $[C_3SO_3HMIM][PTS]$; 1-methyl-3-(3-sulfopropyl)-imidazolium dihydrogenphosphate, $[C_3SO_3HMIM][H_2PO_4]$; 1-methyl-3-(sulfopropyl)-imidazolium chloride, $[C_3SO_3HMIM][Cl]$; 1-methyl-3-(3-sulfopropyl)-imidazolium cupric chloride, $[C_3SO_3HMIM][CuCl_3]$; 1-methyl-3-(3-sulfopropyl)-imidazolium ferric chloride, $[C_3SO_3HMIM][FeCl_4]$; 1-methyl-3-(3-sulfopropyl)-imidazolium stannic chloride, $[C_3SO_3HMIM][SnCl_3]$; 1-butyl-3-methylimidazolium chloride $[BMIM][Cl]$, 1-butyl-3-methylimidazolium bromide $[BMIM][Br]$, 1-methyl-3-(3-sulfopropyl)-benzimidazolium dihydrogenphosphate, $[C_3SO_3HBenzMIM][H_2PO_4]$, 3-sulfopropyl-P,P,P-triphenylphosphonium hydrogensulfate $[C_3SO_3H(C_6H_5)P][HSO_4]$, N,N,N-triethyl-3-sulfopropanaminium hydrogen sulphate, $[C_3SO_3H(C_2)_3N][HSO_4]$; N,N,N-triethyl-3-sulfopropanaminium p-toluenesulfonate, $[C_3SO_3H(C_2)_3N][PTS]$; N,N,N-triethyl-3-sulfopropanaminium chloride, $[C_3SO_3H(C_2)_3N][Cl]$ and N,N,N-triethyl-3-sulfopropanaminium dihydrogenphosphate, $[C_3SO_3H(C_2)_3N][H_2PO_4]$, and wherein polymer to catalyst ratio is in the range of 20.0:0.01-20:10.0, in an ethylene glycol:dioxane solvent mixture, wherein ethylene glycol:dioxane ratio is in the range of 1.0:0.01-1.0:5.0 (v/v), at a temperature in the range of 120-250° C. for a period in the range of 0.5 to 24 hr;
b) adding water and diethyl ether into the reaction mixture obtained at step a) after completion of the reaction;
c) washing ether layer obtained at step b) with aqueous NaOH solution;
d) acidifying aqueous layer obtained at step c) to afford valorized product with 100% polymer conversion.

In an embodiment of the present disclosure, there is provided a process for the depolymerization of polymers, wherein the polymer is selected from the group comprising of polyethylene terephthalate (PET), polyethylene furanoate (PEF), Polylactic acid (PLA), polycarbonate, polyethers, and polyamide, and wherein the process comprises the steps of:
a) heating the reaction mixture of polymer and the acidic ionic liquid (AIL) catalyst, wherein said acidic ionic liquid (AIL) is 1-methyl-3-(3-sulfopropyl)-imidazolium hydrogensulfate, [C$_3$SO$_3$HMIM][HSO$_4$] is used as a catalyst, and wherein polymer to catalyst ratio is in the range of 20.0:0.01-20:10.0, in an ethylene glycol:dioxane solvent mixture, wherein ethylene glycol:dioxane ratio is in the range of 1.0:0.01-1.0:5.0 (v/v), at a temperature in the range of 120-250° C. for a period in the range of 0.5 to 24 hour;
b) adding water and diethyl ether into the reaction mixture obtained at step a) after completion of the reaction;
c) washing ether layer obtained at step b) with aqueous NaOH solution; and
d) acidifying the aqueous layer obtained at step c) to afford valorized product with 100% polymer conversion.

In an embodiment of the present disclosure, there is provided a process for the depolymerization of polymers, wherein the polymer is selected from the group comprising of polyethylene terephthalate (PET), polyethylene furanoate (PEF), Polylactic acid (PLA), polycarbonate, polyethers, and polyamide, and wherein the process comprises the steps of:
a) heating the reaction mixture of polymer and the acidic ionic liquid (AIL) catalyst, wherein said acidic ionic liquid (AIL) is 1-methyl-3-(3-sulfopropyl)-imidazolium hydrogensulfate, [C$_3$SO$_3$HMIM][HSO$_4$] is used as a catalyst, and wherein polymer to catalyst ratio is in the range of 20.0:0.50-20:5.0, in an ethylene glycol:dioxane solvent mixture, wherein ethylene glycol:dioxane ratio is in the range of 1.0:0.50-1.0:1.0 (v/v), at a temperature in the range of 170-200° C. for a period in the range of 3 to 7 hours;
b) adding water and diethyl ether into the reaction mixture obtained at step a) after completion of the reaction;
c) washing ether layer obtained at step b) with aqueous NaOH solution; and
d) acidifying the aqueous layer obtained at step c) to afford valorized product with 100% polymer conversion.

In an embodiment of the present disclosure, there is provided a process for the depolymerization of polymers, wherein the polymer is polyethylene terephthalate (PET), and wherein the process comprises the steps of:
a) heating the reaction mixture of polymer and the acidic ionic liquid (AIL) catalyst, wherein said acidic ionic liquid (AIL) is 1-methyl-3-(3-sulfopropyl)-imidazolium hydrogensulfate, [C$_3$SO$_3$HMIM][HSO$_4$] is used as a catalyst, and wherein polymer to catalyst ratio is in the range of 16.25:1.0, in an ethylene glycol:dioxane solvent mixture, wherein ethylene glycol:dioxane ratio is in the range of 1.0:2.5 (v/v), at a temperature of 180° C. for a period of 6 hours;
b) adding water and diethyl ether into the reaction mixture obtained at step a) after completion of the reaction;
c) washing ether layer obtained at step b) with aqueous NaOH solution; and
d) acidifying the aqueous layer obtained at step c) to afford valorized product with 100% polymer conversion.

In an embodiment of the present disclosure, there is provided a process for the depolymerization of polymers, wherein the solvent mixture is selected from the list of polar and non-polar solvents with polarity index ranging from 10.2 to 0.1. In another embodiment of the present disclosure, there is provided a process for the depolymerization of polymers, wherein the polar solvent is selected from water, ammonia, sulfuric acid, deuterium oxide, ethanol, methanol, dioxane, acetone, isopropanol, methyl ethyl ketone, n-propanol, acetonitrile, ethylene glycol, DMSO, and DMF and non-polar solvent is selected from chloroform, pentane, hexane, benzene, toluene, octane, decane, dimethyl ether, and dichloromethane. In particular embodiment of the present disclosure, there is provided a process for the depolymerization of polymers, wherein the solvent mixture of ethylene glycol and 1,4-dioxane is used.

In an embodiment of the present disclosure, there is provided a process for the depolymerization of polymers, wherein the ratio of ethylene glycol to dioxane is in the range of 1.0:0.01-1.0:5.0 (v/v). In particular embodiment of the present disclosure, there is provided a process for the depolymerization of polymers, wherein the ethylene glycol to dioxane solvent volume ratio is 1.0:0.25 (v/v).

In an embodiment of the present disclosure, there is provided a process for the depolymerization of polymers, wherein the mole ratio of polymer to catalyst is in the range of 20.0:0.01-20.0:10.0. In particular embodiment of the present disclosure, there is provided a process for the depolymerization of polymers, wherein the polymer to catalyst mole ratio is 16.25:1.0.

The process for the depolymerisation of polyethylene terephthalate, polycarbonate and polylactic acid into corresponding valorized products is depicted below in scheme-1;
a)

ethylene glycol

Polycarbonate 4-isopropyl phenol

Polylactic acid → Lactic acid

Several experiments have been conducted to decide the reaction parameters and reagent ratios to obtain maximum yield and purity of the product terephthalic acid from polyethylene terephthalate (PET) as a representative process. Table 1 summarizes the results obtained by using different ionic liquid catalyst, which show that almost all used IL's can depolymerize PET into larger or smaller extent. Among the ionic liquid catalysts used, $[C_3SO_3HMIM][HSO_4]$ have shown a maximum of 98% yield with 100% PET conversion.

TABLE 1

| Sr. No | Catalyst | Temp. (°C.) | Time (h) | TA Yield (%) | PET conversion (%) | TA Selectivity (%) |
|---|---|---|---|---|---|---|
| 1 | Without catalyst | 180 | 6 | 0 | 0 | 0 |
| 2 | $[C_3SO_3HMIM][HSO_4]$ | 180 | 6 | 98.6 | 100 | 98.6 |
| 3 | $[C_3SO_3HMIM][PTS]$ | 180 | 6 | 53.3 | 88.1 | 60.5 |
| 4 | $[C_3SO_3HMIM][H_2PO_4]$ | 180 | 6 | 65.8 | 67.6 | 97.3 |
| 5 | $[C_3SO_3HMIM][Cl]]$ | 180 | 6 | 21.8 | 32.2 | 67.7 |
| 6 | $[C_3SO_3HMIM][CuCl_3]$ | 180 | 6 | 78.0 | 100 | 78.0 |
| 7 | $[C_3SO_3HMIM][FeCl_4]$ | 180 | 6 | 72.3 | 96.7 | 74.7 |
| 8 | $[C_3SO_3HMIM][SnCl_3]$ | 180 | 6 | 32.1 | 42.1 | 76.2 |
| 9 | $[BMIM][C]]$ | 180 | 6 | 05.2 | 07.2 | 72.2 |
| 10 | $[BMIM][Br]$ | 180 | 6 | 07.7 | 08.0 | 96.2 |
| 11 | $[C_3SO_3HBenzMIM][H_2PO_4]$ | 180 | 6 | 55.2 | 62.1 | 88.8 |
| 12 | $[C_3SO_3H(C_6H_5)P][HSO_4]$ | 180 | 6 | 41.8 | 45.0 | 92.8 |
| 13 | $[C_3SO_3H(C_2)_3N][H_2PO_4]$ | 180 | 6 | 36.4 | 72.2 | 50.4 |
| 14 | $[C_3SO_3H(C_2)_3N][HSO_4]$ | 180 | 6 | 39.6 | 100 | 39.6 |
| 15 | $[C_3SO_3H(C_2)_3N][PTS]$ | 180 | 6 | 24.3 | 87.9 | 27.6 |
| 16 | $[C_3SO_3H(C_2)_3N][C]]$ | 180 | 6 | 22.6 | 36.8 | 61.4 |

*Reaction condition: PET (0.5 g), catalyst (0.05 g), solvent (EG: dioxane = 2:0.5 v/v mL)

Several experiments have been conducted to analyze effect of reaction time on the conversion and yield of the reaction. The data is summarized below in Table 2. Results show that with $[C_3SO_3HMIM][HSO_4]$ catalyst, PET depolymerisation reaction gives a maximum terephthalic acid yield of 98.6% after 6 h of reaction with 100% PET conversion and 98.6% selectivity.

TABLE 2

| Sr. No | Catalyst | Temp. (°C.) | Time (h) | TA Yield (%) | PET conversion (%) | TA Selectivity (%) |
|---|---|---|---|---|---|---|
| 1 | $[C_3SO_3HMIM][HSO_4]$ | 180 | 0.5 | 2.0 | 2.2 | 90.9 |
| 2 | $[C_3SO_3HMIM][HSO_4]$ | 180 | 2 | 3.1 | 3.2 | 97.0 |
| 3 | $[C_3SO_3HMIM][HSO_4]$ | 180 | 4 | 52.5 | 57.1 | 92.0 |
| 4 | $[C_3SO_3HMIM][HSO_4]$ | 180 | 6 | 98.6 | 100 | 98.6 |
| 5 | $[C_3SO_3HMIM][HSO_4]$ | 180 | 12 | 96.9 | 100 | 96.9 |
| 6 | $[C_3SO_3HMIM][HSO_4]$ | 180 | 24 | 96.7 | 100 | 96.7 |

*Reaction condition: PET (0.5 g), catalyst:$[C_3SO_3HMIM][HSO_4]$ (0.05 g), solvent (EG:dioxane = 2:0.5 v/v mL)

Several experiments have been conducted to study the effect of temperature on the PET depolymerisation reaction. The data is summarized below in Table 3, which shows that maximum yield of TA is obtained at 180° C.

TABLE 3

| Sr. No. | Catalyst | Temp (° C.) | Time (h) | TA Yield (%) | PET conversion (%) | TA Selectivity (%) |
|---|---|---|---|---|---|---|
| 1 | [C$_3$SO$_3$HMIM][HSO$_4$] | 120 | 6 | 15.1 | 17.2 | 87.7 |
| 2 | [C$_3$SO$_3$HMIM][HSO$_4$] | 150 | 6 | 75.0 | 78.0 | 96.1 |
| 3 | [C$_3$SO$_3$HMIM][HSO$_4$] | 180 | 6 | 98.6 | 100 | 98.6 |
| 4 | [C$_3$SO$_3$HMIM][HSO$_4$] | 200 | 6 | 92.3 | 100 | 92.3 |
| 5 | [C$_3$SO$_3$HMIM][HSO$_4$] | 220 | 6 | 91.5 | 100 | 91.5 |
| 6 | [C$_3$SO$_3$HMIM][HSO$_4$] | 250 | 6 | 89.7 | 100 | 89.7 |

*Reaction condition: PET (0.5 g), catalyst- [C$_3$SO$_3$HMIM][HSO$_4$] (0.05 g), solvent (EG:dioxane = 2:0.5 v/v mL)

The data of several experiments conducted with different catalyst concentration is summarized below in Table 4, which show that the minimum catalytic concentration at which maximum yield and selectivity of terephthalic acid obtained is 0.05 g (1.6×10$^{-4}$ mol). (at molar ratio of PET:catalyst=16.25:1).

TABLE 4

| Sr. No. | Catalyst conc (g) | Temp. (° C.) | Time (h) | TA Yield (%) | PET conversion (%) | TA Selectivity (%) |
|---|---|---|---|---|---|---|
| 1 | 0.01 | 180 | 6 | 2.3 | 4.5 | 52.3 |
| 2 | 0.05 | 180 | 6 | 98.6 | 100 | 98.6 |
| 3 | 0.10 | 180 | 6 | 90.6 | 100 | 90.6 |
| 4 | 0.25 | 180 | 6 | 68.5 | 100 | 68.5 |
| 5 | 0.50 | 180 | 6 | 43.9 | 100 | 43.9 |

*Reaction condition: PET (0.5 g), catalyst- [C$_3$SO$_3$HMIM][HSO$_4$], solvent (EG:dioxane = 2:0.5 v/v mL)

The catalyst is water soluble and hence can be easily recovered in its pure form from the reaction mixture during the work-up. Experiments have been conducted by using recycling the catalyst to check the recycling capacity of the catalyst. The as summarized below in Table 5 shows that the acidic ionic liquid catalyst, [C$_3$SO$_3$HMIM][HSO$_4$] is highly efficient and active even after the reaction and even at 6th catalytic cycle also it gives maximum yield of 98.5% of TA.

TABLE 5

| Sr. No. | Catalytic run (cycle) | Temp. (° C.) | Time (h) | TA Yield (%) | PET conversion (%) | TA Selectivity (%) |
|---|---|---|---|---|---|---|
| 1 | 1 | 180 | 6 | 98.6 | 100 | 98.6 |
| 2 | 2 | 180 | 6 | 98.3 | 100 | 98.3 |
| 3 | 3 | 180 | 6 | 98.4 | 100 | 98.4 |
| 4 | 4 | 180 | 6 | 98.4 | 100 | 98.4 |
| 5 | 5 | 180 | 6 | 98.6 | 100 | 98.6 |
| 6 | 6 | 180 | 6 | 98.5 | 100 | 98.5 |

*Reaction condition: PET (0.5 g), catalyst- [C$_3$SO$_3$HMIM][HSO$_4$] (0.05 g), solvent (EG:dioxane = 2:0.5 v/v mL)

Table 6 and Table 7 show the summarized results of the experiments conducted with different concentration of PET and with different coloured PET, respectively. Results show that at the molar ratio of 16.25:1, of PET:catalyst, maximum yield of TA is obtained. Table 7 shows that all the coloured PET can be converted into TA with high yields, purity and selectivity.

TABLE 6

| Sr. No. | PET conc. (g) | Temp. (° C.) | Time (h) | TA Yield (%) | PET conversion (%) | TA Selectivity (%) |
|---|---|---|---|---|---|---|
| 1 | 0.05 | 180 | 6 | 100 | 100 | 100 |
| 2 | 0.1 | 180 | 6 | 98.8 | 100 | 98.8 |
| 3 | 0.2 | 180 | 6 | 98.8 | 100 | 98.8 |
| 4 | 0.5 | 180 | 6 | 98.6 | 100 | 98.6 |
| 5 | 1.0 | 180 | 6 | 50.2 | 98.7 | 50.8 |
| 6 | 1.5 | 180 | 6 | 11.8 | 90.2 | 13.0 |
| 7 | 2.5 | 180 | 6 | 3.4 | 88.9 | 3.8 |
| 8 | 3.0 | 180 | 6 | 1.2 | 82.3 | 1.4 |

*Reaction condition: PET, catalyst- [C$_3$SO$_3$HMIM] [HSO$_4$] (0.05 g), solvent (EG:dioxane = 2:0.5 v/v mL)

TABLE 7

| Sr. No. | PET colour | Temp. (° C.) | Time (h) | TA Yield (%) | PET Conversion (%) | TA Selectivity (%) |
|---|---|---|---|---|---|---|
| 1 | Colourless | 180 | 6 | 98.6 | 100 | 98.6 |
| 2 | White | 180 | 6 | 96.5 | 100 | 96.5 |
| 3 | Blue | 180 | 6 | 93.6 | 100 | 93.6 |
| 4 | Green | 180 | 6 | 95.7 | 100 | 95.7 |
| 5 | Red | 180 | 6 | 90.8 | 100 | 90.8 |
| 6 | Orange | 180 | 6 | 93.9 | 100 | 93.9 |
| 7 | Yellow | 180 | 6 | 95.4 | 100 | 95.4 |

*Reaction condition: PET (0.5 g), catalyst- [C$_3$SO$_3$HMIM][HSO$_4$] (0.05 g), solvent (EG:dioxane = 2:0.5 v/v mL)

Tables 8 and 9 summarize the results of experiments conducted with different solvents and solvent mixtures. Table 8 shows that uni-phase ethylene glycol:dioxane mixture solvent system of ratio 2:0.5 v/v mL is more active in PET depolymerisation than solvent system with only ethylene glycol. Addition of stipulated amount of dioxane with ethylene glycol increases the extent of PET depolymerisation, resulting in enhanced TA yield and PET conversion. The effect of added dioxane is more prominent during the course of reaction at a time duration from 3 to 5 h. Table 9 show that uni-phase mixture solvent systems with active AIL catalyst are efficient in depolymerisation of PET to a larger or smaller extent. Ethylene glycol:dioxane mixture solvent system of ratio 2:0.5 v/v mL is more active in PET depolymerisation than any other solvent systems. Addition of specific amount of dioxane with ethylene glycol solvent results an increase in PET conversion and TA yields.

TABLE 8

| Sr. No. | Solvent system | Temp. (° C.) | Time (h) | TA Yield (%) | PET conversion (%) | TA Selectivity (%) |
|---|---|---|---|---|---|---|
| 1 | Ethylene glycol | 180 | 1 | 0.92 | 1.12 | 82.1 |
| 2 | (2 mL) | 180 | 2 | 2.7 | 2.9 | 93.1 |
| 3 | | 180 | 3 | 22.6 | 28.3 | 79.8 |
| 4 | | 180 | 4 | 39.6 | 50.5 | 78.4 |
| 5 | | 180 | 5 | 73.6 | 80.2 | 91.7 |
| 6 | | 180 | 6 | 92.3 | 96.1 | 96.0 |
| 7 | EG + dioxane | 180 | 1 | 0.89 | 1.08 | 82.4 |
| 8 | (2:0.5 v/v mL) | 180 | 2 | 3.1 | 3.2 | 97.0 |
| 9 | | 180 | 3 | 36.8 | 39.2 | 93.8 |
| 10 | | 180 | 4 | 52.5 | 57.1 | 92.0 |
| 11 | | 180 | 5 | 85.6 | 90.2 | 94.9 |
| 12 | | 180 | 6 | 98.6 | 100 | 96.9 |

*Reaction condition: PET (0.5 g), catalyst [C$_3$SO$_3$HMIM][HSO$_4$] (0.05 g)

TABLE 9

| Sr. No. | Solvent (mL) | Temp. (oC.) | Time* (h) | TA Yield (%) | PET conversion (%) | TA Selectivity (%) |
|---|---|---|---|---|---|---|
| 1 | Water | 180 | 4 | 3.1 | 5.3 | 59.5 |
| 2 | Ethylene glycol | 180 | 4 | 39.6 | 50.5 | 78.4 |
| 3 | 1,4-dioxane | 180 | 4 | 26.3 | 35.1 | 74.8 |
| 4 | Water + EG (2:2 v/v) | 180 | 4 | 11.4 | 27.7 | 41.0 |
| 5 | Water + dioxane (2:2 v/v) | 180 | 4 | 13.6 | 20.4 | 66.9 |
| 6 | Water + EG + dioxane (2:2:0.5 v/v) | 180 | 4 | 11.4 | 17.4 | 65.5 |
| 7 | Water + EG + Dioxane (1:1:1 v/v) | 180 | 4 | 42.1 | 53.8 | 78.4 |
| 8 | EG + dioxane (2:0.5 v/v) | 180 | 4 | 52.5 | 57.1 | 92.0 |
| 9 | EG + dioxane (2:1 v/v) | 180 | 4 | 46.6 | 54.5 | 85.5 |
| 10 | EG + dioxane (1:1 v/v) | 180 | 4 | 42.5 | 52.0 | 81.7 |

*Reaction condition: PET (0.5 g), catalyst- [$C_3SO_3HMIM$][$HSO_4$] (0.05 g).
* To know the real effect of different solvent systems on the PET depolymerisation, all the reactions are quenched after a time duration of 4 h.

Table 10 summarizes the results of the experiments conducted with mixture of different polymers with polyethylene terephthalate (PET). The data shows that PET depolymerisation into pure terephthalic acid is possible selectively from a mixture of plastics. 100% solubility PET in the plastic mixture is also possible with the efficient catalytic-solvent system under optimum reaction conditions.

TABLE 10

| Sr. No. | Substrate | Temp. (° C.) | Time (h) | TA Yield (%) | PET conversion (%) | TA Selectivity (%) |
|---|---|---|---|---|---|---|
| 1 | Only PET (0.5 g) | 180 | 6 | 98.6 | 100 | 98.6 |
| 2 | PET + PVC (0.25:0.25 g/g) | 180 | 6 | 58.2 | 100 | 58.2 |
| 3 | PET + Polycarbonate (0.25:0.25 g/g) | 180 | 6 | 62.4 | 100 | 62.4 |
| 4 | PET + PP (0.25:0.25 g/g) | 180 | 6 | 76.5 | 100 | 76.5 |
| 5 | PET + HDPE (0.25:0.25 g/g) | 180 | 6 | 61.5 | 100 | 61.5 |
| 6 | PET + LDPE (0.25:0.25 g/g) | 180 | 6 | 75.3 | 100 | 75.3 |
| 7 | PET + Polystyrene (0.25:0.25 g/g) | 180 | 6 | 84.6 | 100 | 84.6 |

*Reaction condition: Substrate (0.5 g), catalyst- [$C_3SO_3HMIM$][$HSO_4$] (0.05 g), solvent (EG:dioxane = 2:0.5 v/v mL)

Table 11 below summarizes the results for depolymerization of various polymers using AIL.

TABLE 11

| Sr. No. | Substrate | Temp. (° C.) | Time (h) | Monomer Yield (%) | Polymer conversion (%) | Monomer Selectivity (%) |
|---|---|---|---|---|---|---|
| 1 | PET | 180 | 6 | 98.6 | 100 | 98.6 |
| 2 | Polycarbonate | 180 | 6 | 51.0 | 100 | 51.0 |
| 3 | Polylactic acid | 180 | 6 | 20.1 | 100 | 20.1 |
| 4 | Polyamide | 180 | 6 | 38.4 | 100 | 38.4 |

*Reaction condition: Substrate (0.5 g), catalyst- [$C_3SO_3HMIM$][$HSO_4$] (0.05 g), solvent (EG:dioxane = 2:0.5 v/v mL)

Figure 1:
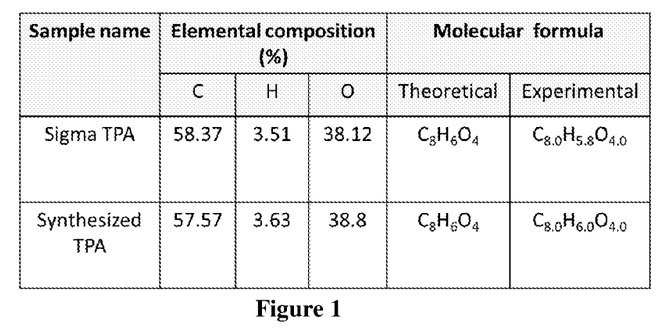
FIG. 1 depicts Elemental analysis (CHNS): Percentage elemental composition of obtained product and the standard terephthalic acid (Sigma) matches exactly.

General Information:

CHNS: Elemental analysis were done in Thermo Finnign, Ilaly, model EA1112 series Flash Elemental Analyzer. This analyzer measures the amount of C, H, N and S in the sample by rapid combustion of small amounts (1-2 mg) of the sample in pure $O_2$ (Dumas method or flash combustion) The analysis of all elements in the CHNS group was performed simultaneously.

Figure 2:
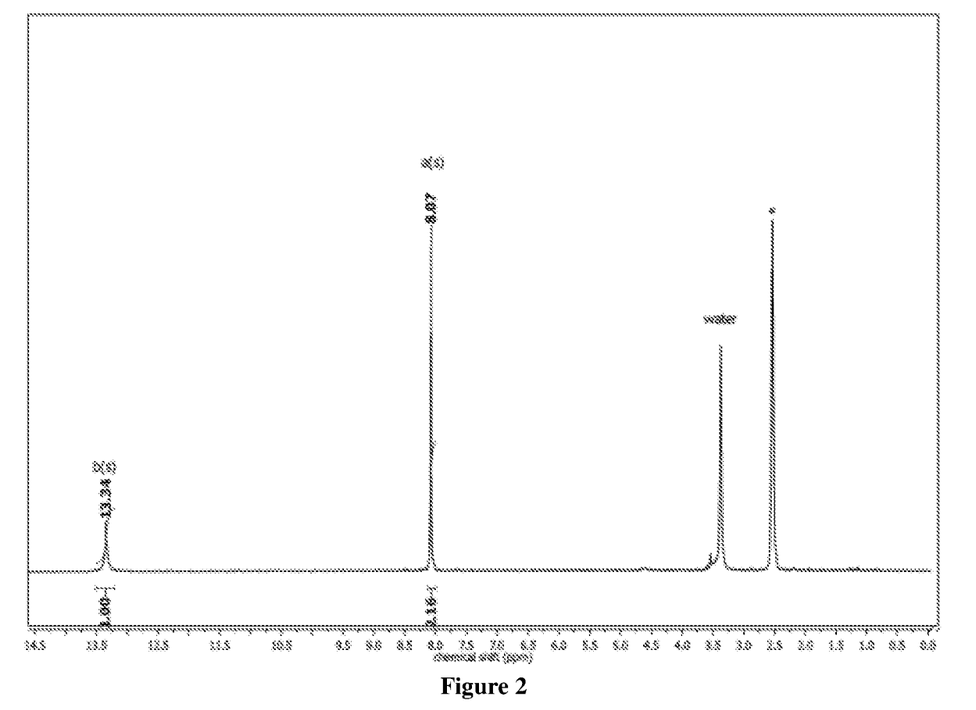
FIG. 2 depicts NMR Spectroscopy ($^1$HNMR): Terephthalic acid formation was confirmed by comparing $^1$HNMR spectra of both obtained product and the standard terephthalic acid (Sigma).

$^1$HNMR: Liquid $^1$HNMR of the sample and the standard product were recorded on Bruker Duel 200 MHz at 25° C. using DMSO-$d_6$ as solvent with TMS as the internal standard. The sample consists of 20 mg of product dissolved in 0.7 mL DMSO-$d_6$. No. of scans used were 4.

Figure 3:
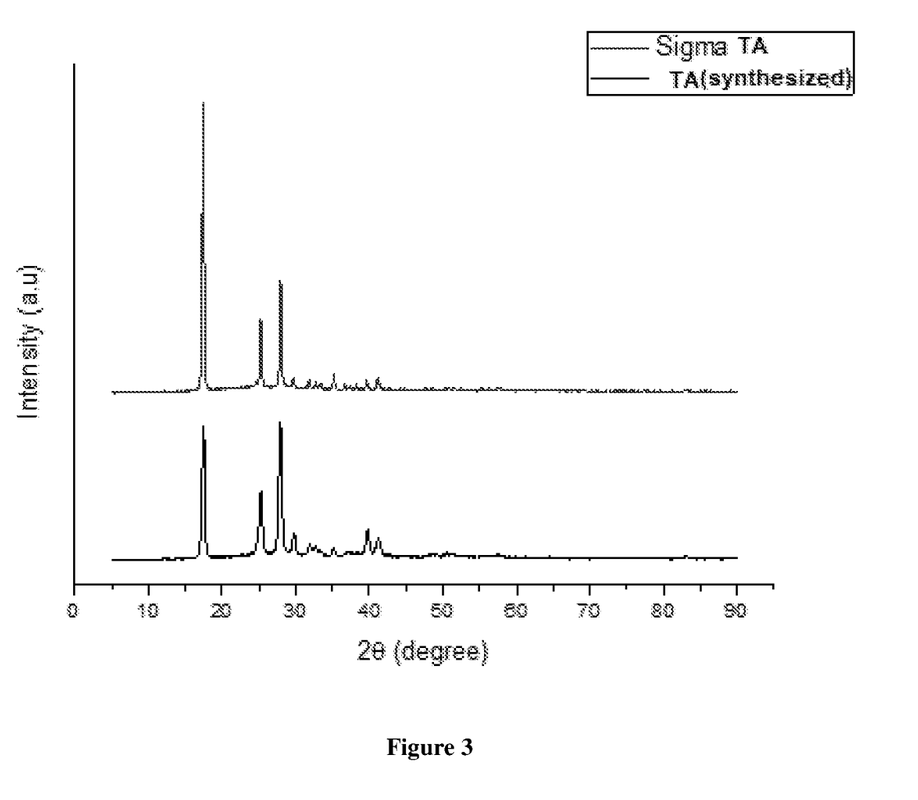
FIG. 3 depicts X-Ray Diffractometry: Powder XRD pattern of both the obtained terephthalic acid and the standard terephthalic acid matching exactly with all the peaks.

XRD: Powder X-Ray diffraction patterns were recorded on a Rigaku Miniflex diffractometer using Ni-filtered monochromatic Cu K$_\alpha$ radiation ($\lambda$=1.5406 A°). The samples were prepares as a thin film on a glass XRD plate and were scanned between a 2θ range of 5 and 90° at the scan rate of 2°/min.

Figure 4A:
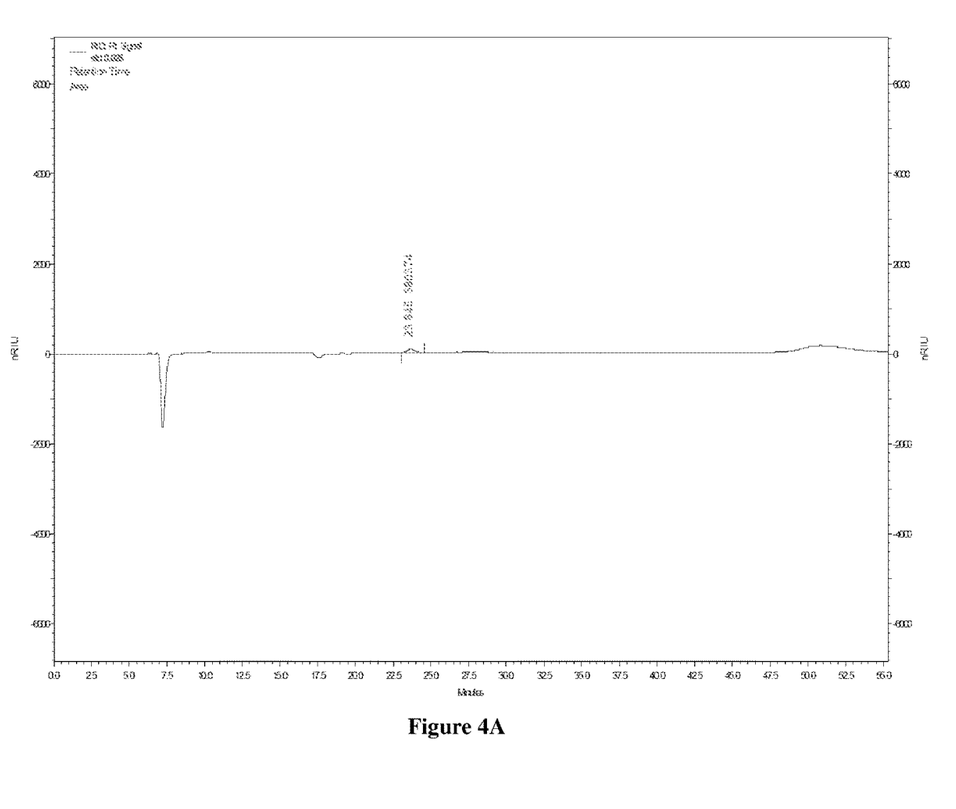
Figure 4B:
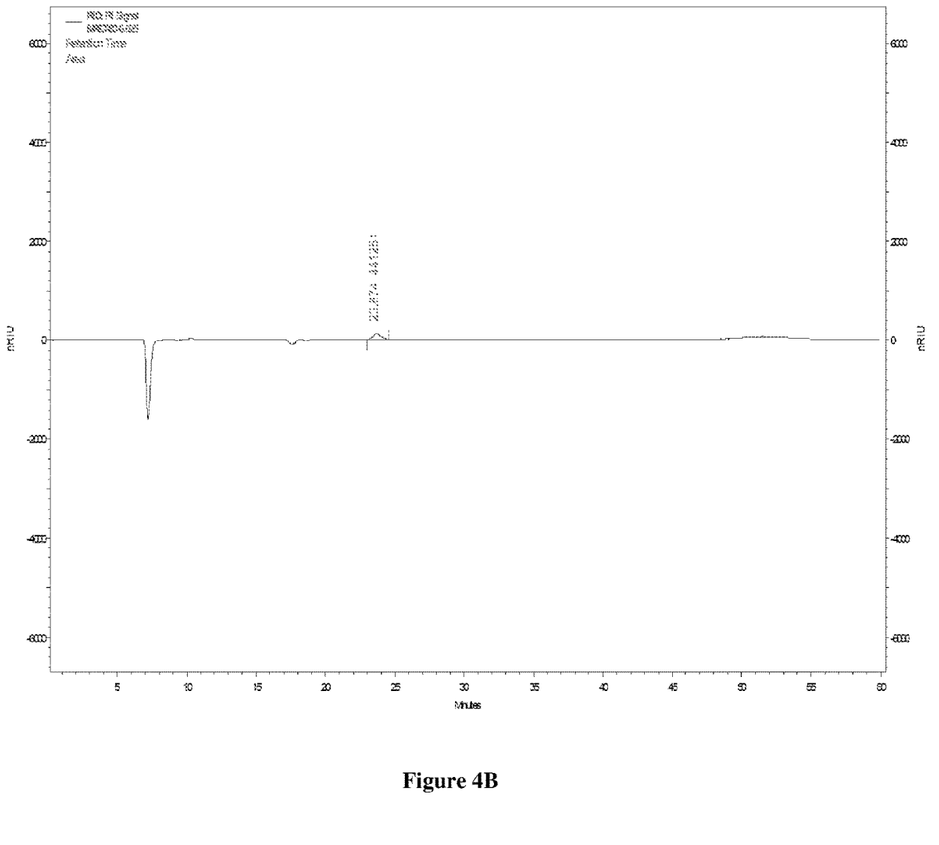
Figure 5:
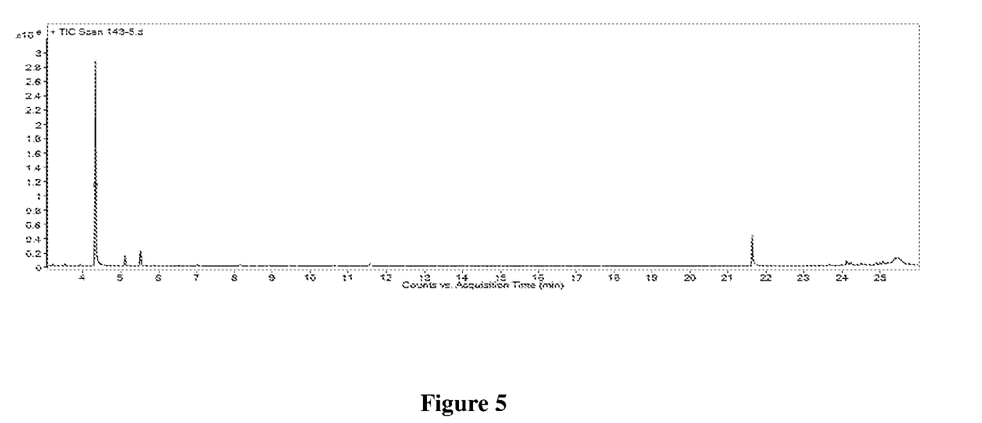
FIG. 5 depicts the GC-MS profile of polycarbonate depolymerisation reaction. From GC-MS profile, the main product of polycarbonate depolymerisation was found to be 4-isopropyl phenol. Further, yield was calculated by taking the area percentage of the peak from GC profile.
Figure 6:
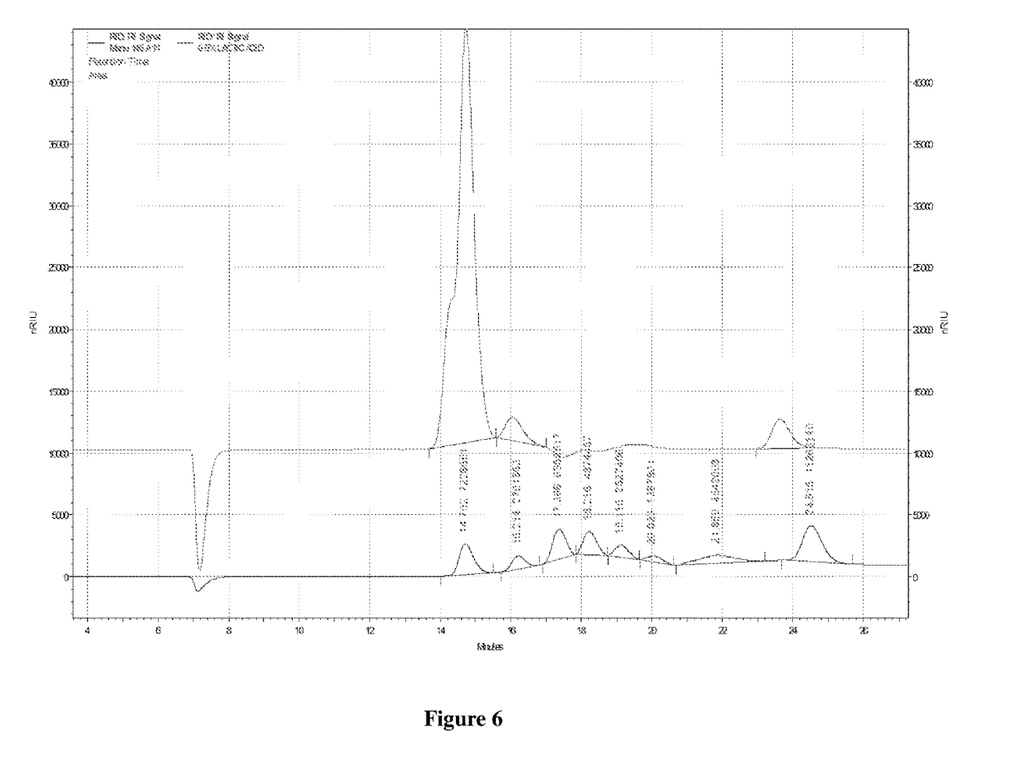
FIG. 6 depicts HPLC profile of polylactic acid depolymerisation reaction. Lactic acid product formation in polylactic acid depolymerisation was confirmed by doing HPLC analysis of water-soluble fraction of reaction mixture and comparing with standards of lactic acid. Yield was calculated by absolute calibration method.

HPLC: Obtained TA and standard TA were analyzed using Agilent make High Performance Liquid Chromatography (HPLC, 1260 Infinity series) system equipped with autosampler, Rezex ROR-Organic Acid H$^+$ column (300 mm length× 7.8 mm i.d, 30° C.) and Refractive Index (RI) detector (40° C.). 5 mM $H_2SO_4$ was used as a mobile phase with a flow rate of 0.6 mL/min. The samples were prepared as 0.025 wt % sodium salt (sodium terephthalate) solution in Millipore water.

EXAMPLES

Following examples are given by way of illustration and therefore should not be construed to limit the scope of the invention.

By using the work-up procedure based on the product solubility in water medium at different temperature as reported by Hui Wang et al. in J. Eurpolymj., 2009; (45), 1535-1544, the Bis(2-Hydroxyethyl) terephthalate (BHET) monomer is obtained as main PET depolymerisation product.

Example 1: General Process for the Depolymerisation of Polymers

In a Teflon autoclave 0.5 g polymer, solvent (EG:dioxane in 2:0.5 v/v=mL ratio) and 0.05 g of the AIL catalyst (16.25:1 mol ratio of polymer:catalyst)) were added and heated at a temperature of 180° C. for a period of 6 hours, without stirring. After the completion of the reaction, 40 mL water and 40 mL diethyl ether were added into the obtained mixture. Then the ether layer was separated and washed several times with 60 mL of 5 wt % aqueous NaOH solution. Further, the aqueous layer was separated and acidified with 10 mL Conc. HCl (pH~2) to afford pure corresponding valorized product. Product obtained is then washed with 50 ml distilled water, filtered under vacuum and dried at 60° C. overnight.

Hplc Data for Depolymerisation of Polyethylene Terephthalate (PET):

| Sample | Retention Time | Area |
|---|---|---|
| Standard (TA) | 23.645 | 380374 |
| TA by above process | 23.674 | 441251 |

ADVANTAGES OF THE INVENTION

Depolymerisation of PET into terephthalic acid with a newer methodology (Glycolysis-hydrolysis reaction) using mild reaction conditions.

Depolymerization of Polycarbonate, Polyethylene furanoate, Polylactic acid, Polyethylene naphthalate, and Polyamide was done.

Utilisation of Acidic Ionic Liquid (AIL) as a homogeneous catalyst. In particular we have used Brønsted acidic ionic liquid (BAIL).

100% PET conversion with 98.6% yield of terephthalic acid by using AIL catalyst under optimum reaction conditions.

100% conversion of all polymers was achieved with monomer formation using AIL catalyst under optimum reaction conditions.

Extra pure product in high yields compared with other methods of depolymerisation.

100% solubilisation of PET under optimum reaction conditions even in the absence of stirring.

Utilisation of water soluble, biodegradable, easily recoverable and recyclable catalyst.

Cheap, easily available and recoverable solvent system.

Depolymerisation of coloured PET into pure white terephthalic acid in high yields.

Selective PET depolymerisation, even in mixture of plastics.

We claim:

1. A process for the depolymerization of polymers, the process comprising the steps of:
   a) heating a mixture of polymer and an acidic ionic liquid (AIL) catalyst, wherein polymer to catalyst ratio is in the range of 20.0:0.01-20:10.0 (mol/mol), in an ethylene glycol:dioxane solvent mixture, wherein ethylene glycol:dioxane ratio is in the range of 1.0:0.01-1.0:5.0 (v/v), at a temperature in the range of 120-250° C. for a period in the range of 0.5 to 24 hour, whereby a reaction mixture is obtained,
   b) adding water and diethyl ether into the reaction mixture obtained at step a) after completion of the reaction;
   c) washing ether layer obtained at step b) with aqueous NaOH solution; and
   d) acidifying the aqueous layer obtained at step c) to afford valorized product with 100% polymer conversion.

2. The process as claimed in claim 1, wherein the polymer is selected from the group consisting of polyethylene terephthalate (PET), polyethylene furanoate (PEF), Polylactic acid (PLA), polycarbonate, polyethers, and polyamide.

3. The process as claimed in claim 1, wherein said acidic ionic liquid (AIL) catalyst is selected from the group consisting of 1-methyl-3-(3-sulfopropyl)-imidazolium hydrogensulfate, $[C_3SO_3HMIM][HSO_4]$; 1-methyl-3-(3-sulfopropyl)-imidazolium p-toluenesulfonate, $[C_3SO_3HMIM][PTS]$; 1-methyl-3-(3-sulfopropyl)-imidazolium dihydrogenphosphate, $[C_3SO_3HMIM][H_2PO_4]$; 1-methyl-3-(sulfopropyl)-imidazolium chloride, $[C_3SO_3HMIM][Cl]$; 1-methyl-3-(3-sulfopropyl)-imidazolium cupric chloride, $[C_3SO_3HMIM][CuCl_3]$; 1-methyl-3-(3-sulfopropyl)-imidazolium ferric chloride, $[C_3SO_3HMIM][FeCl_4]$; 1-methyl-3-(3-sulfopropyl)-imidazolium stannic chloride, $[C_3SO_3HMIM][SnCh_3]$; 1-methyl-3-(3-sulfopropyl)-benzimidazolium dihydrogenphosphate, $[C_3SO_3HBenzMIM][H_2PO_4]$, 3-sulfopropyl-P,P,P-triphenylphosphonium hydrogensulfate $[C_3SO_3H(C_6H_5)P][HSO_4]$, N,N,N-triethyl-3-sulfopropanaminium hydrogen sulphate, $[C_3SO_3H(C_2)_3N][HSO_4]$; N,N,N-triethyl-3-sulfopropanaminium p-toluenesulfonate, $[C_3SO_3H(C_2)_3N][PTS]$; N,N,N-triethyl-3-sulfopropanaminium chloride, $[CASO_3H(C_2)_3N][Cl]$ and N,N,N-triethyl-3-sulfopropanaminium dihydrogenphosphate, $[C_3SO_3H(C_2)_3N][H_2PO_4]$.

4. The process as claimed in claim 1, wherein said acidic ionic liquid (AIL) is 1-methyl-3-(3-sulfopropyl)-imidazolium hydrogensulfate, $[C_3SO_3HMIM][HSO_4]$.

* * * * *